United States Patent
Lincoln

(10) Patent No.: US 6,869,634 B2
(45) Date of Patent: Mar. 22, 2005

(54) BARBECUE SAUCE AND PROCESS FOR MAKING SAME

(76) Inventor: Naomi H. Lincoln, 5807 Mid Pine, Houston, TX (US) 77049

(*) Notice: Subject to any disclaimer, the term of this patent is extended or adjusted under 35 U.S.C. 154(b) by 593 days.

(21) Appl. No.: 09/883,456

(22) Filed: Jun. 18, 2001

(65) Prior Publication Data

US 2002/0192349 A1 Dec. 19, 2002

(51) Int. Cl.[7] .............................. A23L 1/39; A23L 1/24
(52) U.S. Cl. ...................................... 426/589; 426/520
(58) Field of Search .................................. 426/589, 520

(56) References Cited

U.S. PATENT DOCUMENTS

| 5,063,073 A | * | 11/1991 | Kratochivil | ................. 426/573 |
| 5,368,879 A | * | 11/1994 | White et al. | ................. 426/650 |
| 6,027,751 A | * | 2/2000 | Romick et al. | ................. 426/61 |
| 2003/0059513 A1 | * | 3/2003 | Norris | ........................ 426/589 |

* cited by examiner

*Primary Examiner*—N. Bhat
(74) *Attorney, Agent, or Firm*—Kenneth D. Baugh

(57) ABSTRACT

A barbecue sauce is provided containing a mixture of vinegar, lemon juice, sage, red pepper, paprika, black pepper, white pepper, Worcestershire sauce, steak sauce, margarine, brown sugar, chili powder, garlic salt, onion salt, seasoning salt, meat tenderizer, tomato sauce and ketchup.

28 Claims, No Drawings

BARBECUE SAUCE AND PROCESS FOR MAKING SAME

TECHNICAL FIELD

This invention relates to food treatment and more particularly to a barbecue sauce for use in seasoning foods. In preparing certain food products individuals sometimes find it difficult to get a desired taste consistently. Because of this problem flavor enhancing products have been developed to assist in this regard. One of the more popular flavor enhancing products is sauce. Sauces have been developed to be applied to foods such as, for example, meats, fish, foul and even vegetables, in order to ensure that a desired taste is achieved. In order to achieve this desired taste many sauces have become very extravagant mixtures of many different ingredients, which are sometimes not readily available. Accordingly there becomes a need to provide a sauce which, when used, will consistently provide a unique taste while at the same time being preparable by utilizing readily available ingredients.

BACKGROUND ARTS

Attempts have been made to provide sauces which provide a unique taste. One such sauce is disclosed in U.S. Pat. No. 5,885,644. This sauce includes nuts, vinegar, water, oil and salt. The method of preparation includes preconditioning the nuts with garlic by dry blending to form a substantially homogenous dough-like mixture, mixing the vinegar, water and salt into the dough-like mixture to form a substantially homogenous batter and adding oil to the dough to form a unique chunky crunchy and spreadable sauce. Another sauce is disclosed in U.S. Pat. No, 3,930,030. In this product a barbecue sauce having a tenderizing agent is provided. The tenderizing agent is the proteolytic enzyme papain which is substantially free of amylase, and stabilized against loss of proteolytic activity. This tenderizing agent is provided in combination with tomato paste, sugar, gum-oil, salt, spices, garnish preservative agents, vinegar and water. Although both these products achieve the desired results both these products because of the unique ingredients required may be expensive and somewhat difficult to make. Accordingly it is desirable to provide a product made from readily available ingredients, which is easy to prepare and has the unique taste and advantages of the sauce of the present invention.

DISCLOSURE OF THE INVENTION

The invention relates to an Improved Barbecue Sauce. The barbecue sauce in accordance with the principles of the invention is provided in predetermined weight quantities with a mixture of vinegar, lemon juice, sage, red pepper, paprika, black pepper, white pepper, worcestershire sauce, steak sauce, margarine, brown sugar, chili powder, garlic salt, onion salt, seasoning salt, meat tenderizer, tomato sauce and ketchup.

BEST MODE FOR CARRYING OUT THE INVENTION

The barbecue sauce in accordance with the present invention contains on a weight basis 38.5% vinegar, 1% lemon juice, 0.1% sage, 1.5% red pepper, 0.5% paprika, 1% black pepper, 0.3% white pepper, 3% Worcestershire sauce, 3% steak sauce, 1% margarine, 14% brown sugar 3.5% chili powder, 0.15% garlic salt, 0.15% onion salt, 0.15% seasoning salt, 0.15% meat tenderizer, 7% tomato sauce and 25% ketchup.

A typical process for preparation of the barbecue sauce includes a first step of mixing the vinegar, lemon juice and sage at ambient temperature. Once these ingredients are mixed together they are cooked over a high temperature between 350 degrees F. and 400 degrees F. for approximately 3 minutes or until the sage dissolves thereby forming a first homogenous mixture. As this first mixture continues to cook, the remaining ingredients, that is, the red pepper, paprika, black pepper, white pepper, worcestershire sauce, steak sauce, margarine, brown sugar, chili powder, garlic salt, onion salt, seasoning salt, meat tenderizer, tomato sauce and ketchup are mixed with the first homogenous mixture to form a second homogenous mixture. This second mixture is cooked over the same high temperature between 350 degrees F. and 400 degrees F. for approximately 10 minutes. Once this is done, the temperature is then lowered to between 175 degrees F. and 200 degrees F. and the mixture is allowed to simmer and cook for approximately 60 more minutes. The resulting mixture is the sauce of this invention.

The sauce is then cooled to ambient temperature and appropriately packaged in bottle containers as desired.

In this embodiment the sauce contains on a weight basis 39% vinegar, 0.6% lemon juice, 0.15% sage, 0.7% red pepper, 0.5% paprika, 0.3% black pepper, 0.15% white pepper, 3% Worcestershire sauce, 3% steak sauce, 1.2% margarine, 14.5% brown sugar 3.6% chili powder, 0.15% garlic salt, 0.15% onion salt, 0.15% seasoning salt, 0.15% meat tenderizer, 7.3% tomato sauce and 25.4% ketchup.

A typical process for preparation of the barbecue sauce of this embodiment includes a first step of mixing the vinegar, lemon juice and sage at ambient temperature. Once these ingredients are mixed together they are cooked over a high temperature between 350 degrees F. and 400 degrees F. for approximately 3 minutes or until the sage dissolves forming a first homogenous mixture. The remaining ingredients that is the red pepper, paprika, black pepper, white pepper, worcestershire sauce, steak sauce, margarine, brown sugar, chili powder, garlic salt, onion salt, seasoning salt, meat tenderizer, tomato sauce and ketchup are mixed with the first homogenous mixture to form a second homogenous mixture while cooking at the same temperature continuously for ten additional minutes. The temperature is then lowered to between 175 degrees F. and 200 degrees F. and the mixture is allowed to simmer and cook for an additional 60 minutes.

The sauce is then cooled to ambient temperatures and approximately packaged in bottle containers as desired.

The invention has been shown and described in what is considered to be the most practical and preferred embodiments. However, it should be recognized that changes may be made by those skilled in the art without departing from the spirit and scope of the invention.

What is claimed is:

1. A process for making a barbecue sauce consisting of:
   blending together sauce ingredients including by weight 38.5% vinegar, 1% lemon juice and 0.1% sage at a first predetermined temperature;
   cooking these ingredients at a second predetermined temperature for a first predetermined time to form a first homogenous mixture;
   mixing the remaining ingredients of 1.5% red pepper, 0.5% paprika, 1% black pepper, 0.3% white pepper, 3% Worcestershire sauce, 3% steak sauce, 1% margarine, 14% brown sugar 3.5% chili powder, 0.15% garlic salt, 0.15% onion salt, 0.15% seasoning salt, 0.15% meat tenderizer, 7% tomato sauce and 25% ketchup together with the first homogenous mixture to form a second homogenous mixture;

cooking the second homogenous mixture at the second predetermined temperature for a second predetermined time;

reducing the temperature to a third predetermined temperature and cooking the mixture for a third predetermined time;

cooling the mixture to the first predetermined temperature; and packaging the mixture in a container.

2. A process as defined in claim 1 wherein the first predetermined temperature is ambient temperature.

3. A process as defined in claim 2 wherein the second predetermined temperature is between 350 degrees F. and 400 degrees F.

4. A process as defined in claim 3 wherein the third predetermined temperature is between 175 degrees F. and 200 degrees F.

5. A process as defined in claim 4 wherein the first predetermined time is three minutes.

6. A process as defined in claim 5 wherein the second predetermined time is ten minutes.

7. A process as defined in claim 6 wherein the third predetermined time is sixty minutes.

8. A barbecue sauce product made by the process of claim 1.

9. A barbecue sauce product made by the process of claim 2.

10. A barbecue sauce product made by the process of claim 3.

11. A barbecue sauce product made by the process of claim 4.

12. A barbecue sauce product made by the process of claim 5.

13. A barbecue sauce product made by the process of claim 6.

14. A barbecue sauce product made by the process of claim 7.

15. A process for making a barbecue sauce consisting of:

blending together sauce ingredients including by weight 39% vinegar, 0.6% lemon juice and 0.15% sage at a first predetermined temperature;

cooking these ingredients at a second predetermined temperature to form a first homogenous mixture;

mixing the remaining ingredients of 0.7% red pepper, 0.5% paprika, 0.3% black pepper, 0.15% white pepper, 3% Worcestershire sauce, 3% steak sauce, 1.2% margarine, 14.5% brown sugar 3.6% chili powder, 0.15% garlic salt, 0.15% onion salt, 0.15% seasoning salt, 0.15% meat tenderizer, 7.3% tomato sauce and 25.4% ketchup with the first homogenous mixture to form a second homogenous mixture;

cooking the second homogenous mixture at the second predetermined temperature for a second predetermined time;

reducing the temperature to a third predetermined temperature and cooking the mixture for a third predetermined time;

cooling the mixture to the first predetermined temperature; and packaging the mixture in a container.

16. A process as defined in claim 15 wherein the first predetermined temperature is ambient temperature.

17. A process as defined in claim 16 wherein the second predetermined temperature is between 350 degrees F. and 400 degrees F.

18. A process as defined in claim 17 wherein the third predetermined temperature is between 175 degrees F. and 200 degrees F.

19. A process as defined in claim 18 wherein the first predetermined time is three minutes.

20. A process as defined in claim 19 wherein the second predetermined time is ten minutes.

21. A process as defined in claim 20 wherein the third predetermined time is sixty minutes.

22. A barbecue sauce product made by the process of claim 15.

23. A barbecue sauce product made by the process of claim 16.

24. A barbecue sauce product made by the process of claim 17.

25. A barbecue sauce product made by the process of claim 18.

26. A barbecue sauce product made by the process of claim 19.

27. A barbecue sauce product made by the process of claim 20.

28. A barbecue sauce product made by the process of claim 21.

* * * * *